United States Patent [19]

Rodgers

[11] 3,767,858

[45] Oct. 23, 1973

[54] APPARATUS FOR CONVERTING THE POSITION OF A MANUALLY OPERATED INSTRUMENT INTO AN ELECTRICAL SIGNAL

[75] Inventor: James L. Rodgers, Tempe, Ariz.

[73] Assignee: Talos Systems Inc., Scottsdale, Ariz.

[22] Filed: Nov. 18, 1971

[21] Appl. No.: 199,887

[52] U.S. Cl. .................................................. 178/18
[51] Int. Cl. ............................................ G08c 21/00
[58] Field of Search .................... 178/18, 20, 19, 87

[56] References Cited

UNITED STATES PATENTS

| | | | |
|---|---|---|---|
| 3,624,293 | 3/1970 | Baxter | 178/18 |
| 3,530,241 | 11/1967 | Ellis | 178/18 |

*Primary Examiner*—Kathleen H. Claffy
*Assistant Examiner*—Kenneth Richardson
*Attorney*—William C. Cahill et al.

[57] ABSTRACT

In order to convert the mechanical position of a writing pen, or the like, into electrical signals which can be utilized for various control, data input, and data transmission purposes, a specially configured and excited writing table is utilized, in conjunction with the pen which senses the phase of a field set up by the table, which phase is unique to each pen position on the table. The writing table, in a preferred embodiment includes a grid of conductors with a plurality of parallel conductors making up each dimension of the grid, the two sets of parallel conductors being sufficiently separated to avoid direct contact. Each set of parallel conductors is excited by a plurality of signals identical in frequency, but varying in phase in a predetermined sequence from conductor to conductor. The frequencies used to excite the two sets of parallel conductors are sufficiently different, that they can be electrically separated after the composite field has been sensed by the pen, and passed into individual phase locked loops which serve to both develop the drive to the sets of parallel conductors and provide output signals representative of the pen position in each coordinate. Means are also provided for combining the information in the two coordinates into a single frequency-modulated signal for utilization, by way of example, in telemetering the pen position by wire or wirelessly.

7 Claims, 2 Drawing Figures

INVENTOR
JAMES L. RODGERS
BY
Cahill Sutton Thomas & Phillips
ATTORNEYS

INVENTOR.
JAMES L. RODGERS
BY
Cahill Sutton Thomas & Phillips
ATTORNEYS

APPARATUS FOR CONVERTING THE POSITION OF A MANUALLY OPERATED INSTRUMENT INTO AN ELECTRICAL SIGNAL

This invention relates to the information conversion arts and, more particularly, to means for converting the position of a writing instrument into an analogous electrical signal.

Apparatus for translating the position of a writing instrument into electrical signals for transmission to a remote location such that the position, and corresponding movements, of the writing instrument may be recreated and are well known in the art. Thus, drawings, manuscript, or the like may be reproduced at remote locations. Among the more sophisticated prior art devices are those in which movements of the writing instrument in the X and Y coordinates are incrementally sensed, by resistive means, or the like, and each sensed dimension is translated into a signal capable of transmission by amplitude modulating a carrier frequency, the carrier frequencies for the two coordinates being sufficiently separated to mitigate crosstalk. by way of example, the derived X and Y positional information may be used to amplitude-modulate two separate carriers falling into the traditional 300–3,000 hz telephone line bandwith. It will be readily understood, by those skilled in the telephone arts, that the simultaneous transmission of the X and Y information with voice communications is impossible with this approach, and, further, that certain inaccuracies in reproduction result due to crosstalk, frequency shifts which occur along the transmission paths, multiplexing techniques, and other phenomenon which affect data transmission in both the wireless and wire transmission arts.

Similarly, X and Y information derived in the traditional manner may provide incremental inputs to data processing apparatus such as computers which include a video or plotter input/output device. A basic objection to the known art apparatus is lack of resolution to the degree which would be desirable.

It is therefore a broad object of this invention to provide a new method for determining the mechanical position of a writing instrument to a high degree of resolution and to provide apparatus for practicing the method.

It is another object of this invention to provide such apparatus for which the sensed mechanical position of a writing instrument may be encoded with great accuracy.

It is still a further object of this invention to provide apparatus for encoding the position information in such a manner that it may be transmitted or recorded for reproduction with great accuracy virtually independently from the quality of the transmitting or recording medium.

Figure 1A:
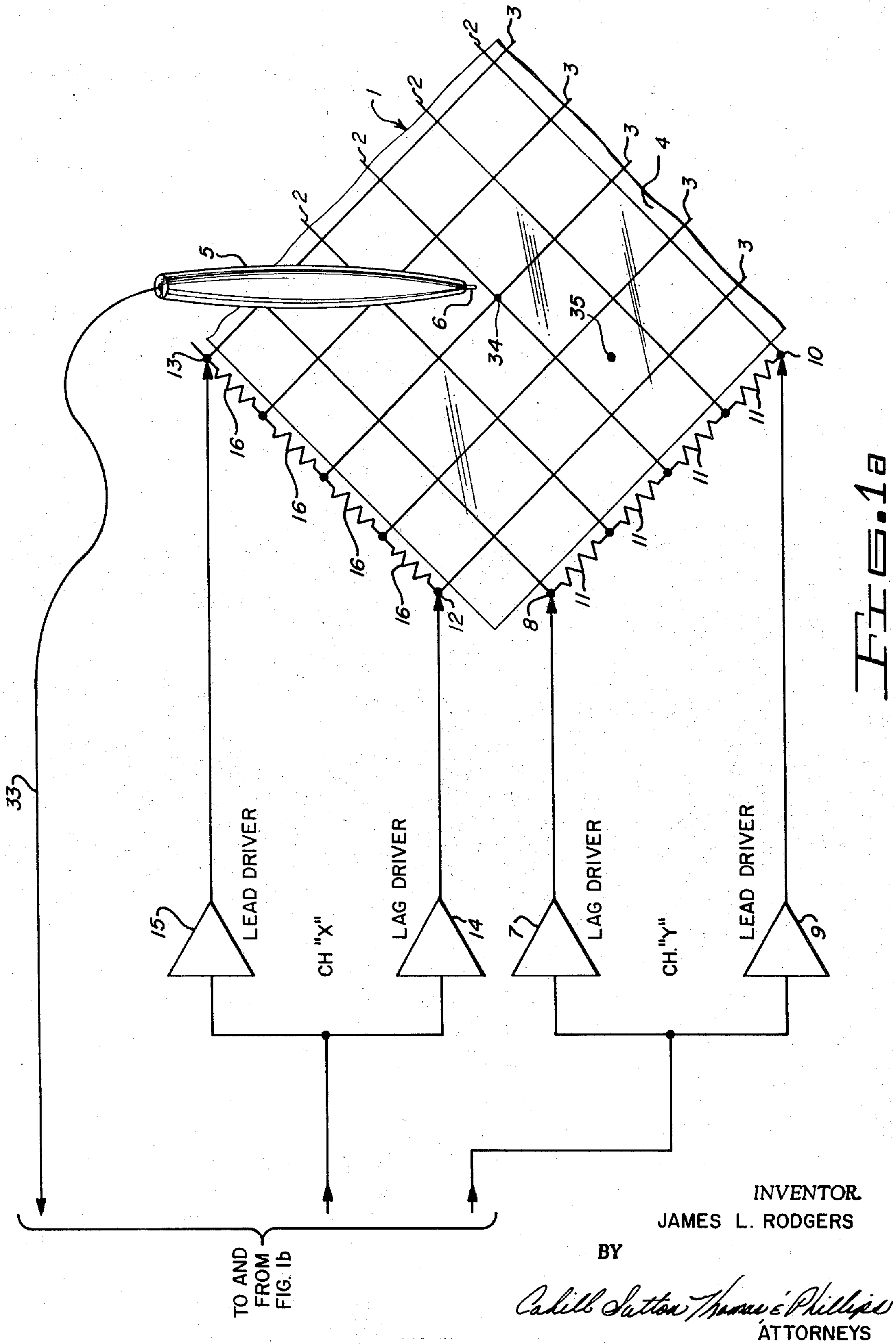
Figure 1B:
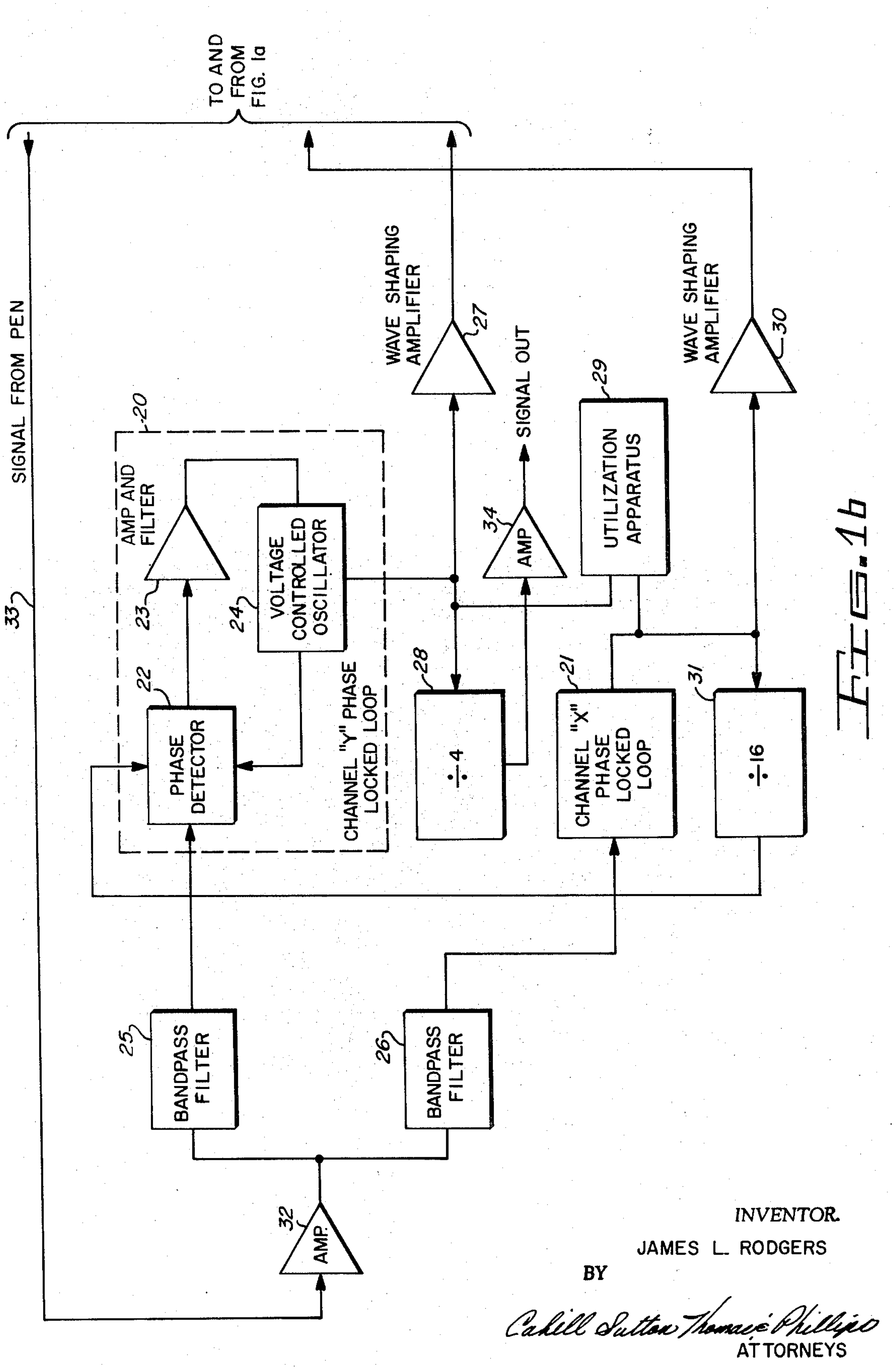

These and other objects of the invention will become more readily apparent to those conversant with the art through a perusal of the following specification taken in conjunction with the figures of which:

FIG. 1*a* is a part of the system block diagram illustrating in particular the writing tablet and the driving and sensing means associated therewith, and;

FIG. 1*b* illustrates the remainder of the system block diagram with emphasis on the manner in which the two channels are handled to drive the writing tablet and derive meaningful information from the position of the writing pen illustrated in FIG. 1*a*.

The system elements are separated into FIGS. 1*a* and 1*b* mainly for convenience, and should be considered as a unitary figure in the following description. The writing table 1 generally comprises a grid consisting of a first set of parallel Y wires 2 and a second set of parallel X wires 3 disposed at right angles to the wires 2. It will be understood that the wires 2 and 3 do not touch one another where they cross inasmuch as they are slightly, uniformally separated in the third dimension. Thus, the wires 2 fall into a plane parallel to but slightly displaced from the plane containing the wires 3. A thin, rigid writing surface 4 overlays the grid consisting of the wires 2 and 3. The writing surface 4 is used to support a writing material such as blank, lined, graph, or other paper upon which the special writing pen 5 may be used. The tip 6 of the pen 5 functions in the manner of the usual ballpoint pen and also as an antenna for reasons which will become apparent as the description of the system proceeds.

A channel Y lag driver 7 feeds one end of the Y wire set at electrical point 8, and a channel Y lead driver 9 feeds the other end of the Y wire set at electrical point 10. Electrical points 8 and 10 are separated by a plurality of resistors 11 with each of the Y wires 2 connected to a junction of adjacent ones of the resistors 11. Similarly, electrical point 12 and electrical point 13 at the two ends of the set of X wires 3 are driven, respectively, by channel X lag driver 14 and channel X lead driver 15. The individual X wires 3 are each connected to a junction of adjacent ones of a plurality of resistors 16 with separate electrical points 12 and 13.

A fundamental constituent of each channel is a phase locked loop which has characteristics to be described more fully below. The channel Y phase locked loop 20 and the channel X phase locked loop 21 are basically the same although they operate at substantially different center frequencies. Thus, referring in particularly to the channel Y phase locked loop 20, it will be noted that the elements therewithin include a phase detector 22 which drives an amplifier and filter element 23 which, in turn, drives a voltage controlled oscillator 24. The oscillator 24 provides both an output signal and feedback to the phase detector 22. Those skilled in the art will recognize the classical phase locked loop configuration.

An output signal is taken from the voltage controlled oscillator 24 and is impressed as the input to a wave shaping amplifier which has an output coupled to the channel Y lag driver 7 and the channel Y lead driver 9. Additionally, the output signal from the voltage controlled oscillator 24 is applied to a frequency divider 28 and also as one input to generalized utilization apparatus 29. Similarly, the channel X phase locked loop 21 has an output signal impressed on a wave shaping amplifier 30, which has its output coupled to the channel X lag driver 14 and the channel X lead driver 15, as well as on a second input to the utilization apparatus 29 and to a frequency divider 31.

The pen point 6 of the special writing pen 5 functions as an antenna picking up a composite field signal generated from the X and Y wires. The pen 5 may advantageously incorporate a pre-amplifier to achieve desirable signal-to-noise characteristics although such is not absolutely essential. In any event, the signal sensed by the pen point 6 is coupled to the input to an amplifier 32 by a conductor 33. The output from the amplifier 32 is impressed on the input terminals of bandpass filters 25 and 26 which feed, respectively, the channel Y phase locked loop 20 and the channel X phase locked loop 21. The pass bands of the filters 25 and 26 are selected to pass signals in the frequency range across which the respective voltage controlled oscillators of the phase locked loops 20 and 21 function and thus, as will become more apparent below, electrically separate the X and Y position information.

The output signal from the frequency divider 31 is a signal at, for example, one-sixteenth the frequency issued from the voltage controlled oscillator of the channel X phase locked loop. This signal is impressed as a third input to the phase detector 22 of the channel Y phase locked loop in order to frequency-modulate the channel Y information with channel X information. The output signal from the frequency divider 28, which will be a fourth sub-harmonic of the signal issued by the voltage controlled oscillator 24, contains both channel Y and channel X information and is conditioned by the amplifier 34 to provide an output signal capable of being interfaced with ordinary telephone lines.

The operation of a phase locked loop is well documented in the literature and therefore need be discussed only briefly to provide an understanding of its utilization as a circuit element in the present invention. Referring to the channel Y phase locked loop 20, the center frequency of the voltage controlled oscillator 24 may be selected by utilizing timing components having values in accordance with the desired center frequency. If the d-c voltage issuing from the amplifier and filter 23 isa at a predetermined level, then the voltage controlled oscillator 24 will operate at its nominal frequency. However, if the d-c voltage issued from the amplifier and filter 23 deviates in either direction from this predetermined value, the frequency of voltage controlled oscillator 24 shifts as a linear function of the voltage change.

The amplifier and filter 23 issues a d-c voltage in accordance with the signal it receives from phase detector 22, and the signal issued by the phase detector 22 is directly related to the difference in phase, if any, between the reference signal received from the voltage controlled oscillator 24 and the input signal received from the bandpass filter 25. If any phase difference exists, the voltage controlled oscillator reacts by shifting its frequency of operation to bring the input signals back into phase. Because of the complexity of phase locked loop circuitry, the use of integrated circuits such as the type LM 565 manufactured by National Semiconductor Corporation are preferred at present.

It will be observed that an output signal from the voltage controlled oscillator 24 is impressed as an input on the wave shaping amplifier 27 which, in a presently preferred embodiment of the invention, issues a triangular waveform to the channel Y lag driver 7 and channel Y lead driver 9. The channel Y lag driver 7 serves to shift the phase of the input signal thereto a predetermined amount, such as 45°, in the lag direction. Similarly, the channel Y lead driver shifts the signal ahead through an identical angle such that the signal appearing at electrical point 10 may be identical in frequency and waveform to that appearing at electrical point 8 with a total phase shift between electrical points 8 and 10 being 90°. The resistors 11 serve to spread this phase shift equally (or in some other predetermined distribution) between the electrical points 8 and 10 such that the time varying voltages applied to the wires 2 at junctions of the resistors 11 will each have a unique phase relationship to the signal issued by the voltage controlled oscillator 24.

Correspondingly, a signal from the voltage controlled oscillator (not shown) of the channel X phase locked loop 21 is passed through the wave shaping amplifier 30 and through channel X lead driver 15 and channel X lag driver 14 to excite the electrical points 13 and 12, respectively, with signals identical in frequency and waveform but offset from one another by 90°. The phase difference is distributed to the X wires 3 by means of the resistors 16 such that the time varying voltage applied to each of the wires 3 has a unique phase relationship to the signal issued from the channel X phase locked loop 21. In accordance with the well known laws of electrostatics, a field will be generated about each of the wires 2 and 3 and the signal sensed by the pen 5 will be an instantaneous summation of the electrostatic fields generated by all the wires 2 and 3 according to their amplitudes at the position of the pen point 6.

In order to segregate the X and Y position information, it is necessary that the X and Y voltage controlled oscillators in the corresponding phase locked loops 21 and 20 function in well separated frequency bands. For example, in a presently preferred embodiment, the center frequency of the channel Y voltage controlled oscillator 24 is 7 khz, and that of the corresponding voltage controlled oscillator in the channel X phase locked loop 21 is 1,440 hz. Correspondingly, the bandpass filters 25 and 26 are centered at 7 khz and 1,440 hz, respectively.

Consider now a condition in which the pen point 6 is situated at physical point 34 on the writing table 1. It wil be noted that the physical point 34 lies just above the center ones of the Y wires 2 and the X wires 3. As a result, the electromagnetic signal sensed by the per point 6 is made up of components in both the X and Y directions which equally lead and lag the signals applied to the drivers 7, 9, 14 and 15 and therefore exhibits zero total phase shift with respect thereto. The signal from the pen, amplified through the amplifier 32, is separated into the X and Y components by the bandpass filters 26 and 25, respectively. The Y component is impressed on the phase detector 22 of the channel Y phase locked loop 20, and the phase detector, in comparing the phases of this signal and the reference signal received from the voltage controlled oscillator 24, observes a zero phase difference such that the voltage controlled oscillator 24 continues to function at 7 khz. Similarly, the phase detector (not shown) of the channel X phase locked loop 21 will also observe a zero phase difference, and the output frequency from the channel X phase locked loop will therefore remain at 1,440 hz.

Suppose, however, that the pen point 6 is situated at physical point 35 on the writing table 1. In that event, with respect to the Y component of the signal sensed by the pen point 6, the phase thereof will lead the signal applied to the drivers 7 and 9 by an angle determined by the phsical and electrical characteristics of the writing table 1, the resistors 11, and the wires 2. The phase detector 22 responds to this sensed phase difference by applying an error signal to the voltage controlled oscillator 24 to bring about an increase in frequency sufficient to stabilize the channel Y phase locked loop to zero phase shift. However, at physical point 35, the X component of the field sensed by the pen point 6 lags the input signal to the drivers 14 and 15 such that the channel X voltage controlled oscillator (not shown) will shift to a lower frequency to restore the zero phase shift condition naturally sought by the channel X phase locked loop 21.

Thus, it will readily be observed that the output frequencies from the channel Y phase locked loop 20 and the channel X phase locked loop 21 provide an instantaneous two dimensional indication of the exact position of the pen point 6 on the writing table 1. This two channel frequency information may be applied separately to the generalized utilization apparatus 29 which may consist of any conversion apparatus, storage apparatus, or data transmission apparatus capable of handling such information. Exemplary apparatus capable of performing such functions are well known in the art and need not be considered at length here since the utilization apparatus is outside the scope of the present invention. Merely by way of example, utilization apparatus 29 might typically consist of a remote two dimensional plotter, an analog-digital converter comprising an input to a digital computer or a digital storage device, a two channel wireless or wire transmitter, or the like.

The invention, in a presently preferred embodiment, finds a highly advantageous application in coupling the pen position information to remote apparatus over a single channel such as a conventional telephone circuit. In order to carry out this specific function, the channel X and channel Y information is combined into frequency-modulated signal with a shifting carrier frequency. The output signal from the channel X phase locked loop 21 is passed through a frequency divider 31 which performs a frequency division of 16. Therefore, the output signal from the frequency divider 31 will be frequency-modulated about a center frequency of 90° hz. This channel X frequency divided information is applied as a separate input to the channel Y phase detector 22 and thus serves to frequency-modulate the instantaneous channel Y frequency. With this arrangement, the frequency at which the channel Y voltage controlled oscillator 24 functions is slightly affected by the channel X information, but the effect, insofar as channel Y operation of the writing table 1 is concerned, is inconsequential because the modulating freuqency is well below the passband of the bandpass filter 25.

The output signal from the channel Y voltage controlled oscillator 25 therefore has an instantaneous frequency primarily determined by the position of the pen point 6 in the Y direction with a further frequency component attributable to the X position of the pen point 6. The output signal from the channel Y phase locked loop 20 centered about 7 khz is passed through a frequency divider 28 which divides the instantaneous frequency by four to provide an output to an amplifier 24 having a center frequency of 1,750 hz which is in a useable portion of the conventional telephone circuit bandwidth. As the pen 5 is manipulated on the writing table 1, the instantaneous frequency of the signal issued by the amplifier 34 will vary about 1,750 hz in accordance with the instantaneous X and Y position information. By utilizing tracking filters, that portion of the telephone quality circuit bandpass not utilizing, instantaneously, the pen position information may be allocated to voice transmission.

The combined pen position and voice information may be separated and recovered at a remote location by a similar tracking filter. The pen position information may then be passed through a channel Y phase locked loop substantially identical to the element 20 to extract a signal related to instantaneous frequency for driving a channel Y reproducing pen servo. The channel X information is separated from the channel Y information by simply utilizing a bandpass filter, the output of which is applied to a channel X phase locked loop which issues a signal driving a channel Y reproducing pen servo. Such two dimensional servos are well known in the art and typically include feedback means, such as a potentiometer, to provide an indication to the reproducing phase locked loops of the instantaneous position of the reproducing pen.

Certain simplifications have been made in the above description of a presently preferred embodiment of the invention to achieve clarity. For example, some phase shift may take place through the circuitry, and, inasmuch as this source of phase shift remains constant, it may be suitably compensated for during an initial adjustment procedure. Additionally, it will be understood that one, two and three dimensional equivalents to the writing tablet may be substituted and the position of an antenna element corresponding to the writing pen may be determined by providing one, two or three channels operating at sufficiently diverse frequencies. Further, it will be recognized that the resistors 11 and 16 may not have uniform values nor is it necessarily desirable for the wires 2 and 3 to be uniformally spread. Indeed, it has been found necessary, in order to achieve linearity, to provide resistors 11 and 16 varying somewhat in value from the ones near the center of the grid to the ones near the electrical feed points. Alternatively, the distance between adjacent wires in each plane of the grid may be adjusted to achieve linearity. As a practical matter, a combination of both methods may be utilized. By the same means, characteristics other than linear (such as logarithmic) can be accorded the writing area by appropriately selecting the values of each of the resistors in the groups 11 and 16 as well as the spacing between the wires comprising the grid. The number of wires 2 and 2 and resistors 11 and 16 in each plane is, of course, typically much greater than that shown in FIG. 1*a*.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for converting the position of a manually operated instrument into an electrical signal comprising:

a. a first series of spaced-apart, parallel conductors;

b. means for generating a first time varying audio frequency signal;

c. first phase lead means for advancing the phase of said first time varying signal by a first predetermined angle to provide a first advanced time varying signal;

d. first phase lag means for retarding the phase of said first time varying signal to provide a first retarded time varying signal;

e. a first plurality of serially connected resistors electrically disposed between the respective outputs of said first phase lead means and said first phase lag means, each junction of adjacent ones of said first plurality of resistors being connected to a different one of said conductors in said first series of conductors to set up a corresponding time varying electrostatic field thereabout;

f. pickup means included in said manually operated instrument for sensing the composite time varying field at said pickup means, and g. means for correlating the position of said manually operated instrument, with respect to said first series of conductors in a plane parallel to the plane of said first series of conductors and in a direction perpendicular to said first series of conductors, to the phase of a first field component sensed by said pickup means.

2. The apparatus of claim 1 which includes a first phase locked loop having a first oscillator for generating said first time varying audio frequency signal, said manually operated instrument being coupled to said first phase locked loop such that the phase of the first field component sensed by said pickup means is resolved to a first predetermined value with respect to said first time varying audio frequency signal by shifting the frequency of said first oscillator until said first predetermined phase relationship is established.

3. The apparatus of claim 1 which further includes:

a. a second series of spaced-apart, parallel conductors;

b. means for generating a second time varying audio frequency signal;

c. second phase lead means for advancing the phase of said second time varying angle by a second predetermined angle to provide a second advanced time varying signal;

d. second phase lag means for retarding the phase of said second time varying angle to provide a second retarded time varying signal;

e. a second plurality of serially connected resistors electrically disposed between the respective outputs of said second phase lead means and said second phase lag means, each junction of adjacent ones of said second plurality of resistors being connected to a different one of said conductors to set up a corresponding time varying field thereabout; and f. means for correlating the position of said manually operated instrument, with respect to said second series of conductors in a plane parallel to the plane of said second series of conductors and in a direction perpendicular to said second series of conductors, to the phase of a second field component sensed by said pickup means.

4. The apparatus of claim 3 which includes:

a. a first phase locked loop having a first oscillator for generating said first time varying audio frequency signal, said manually operated instrument being coupled to said first phase locked loop such that the phase of the first field component sensed by said pickup means is resolved to a first predetermined value with respect to said first time varying audio frequency signal by shifting the frequency of said first oscillator until said first predetermined phase relationship is established; and b. a second phase locked loop having a second oscillator for generating said second time varying audio frequency signal, said manually operated instrument being coupled to said second phase locked loop such that the phase of the second field component sensed by said pickup means is resolved to a second predetermined value with respect to said second time varying audio frequency signal by shifting the frequency of said second oscillator until said second predetermined phase relationship is established.

5. The apparatus of claim 4 in which said first and second oscillators operate about different center frequencies.

6. The apparatus of claim 5 in which said conductors of said first plurality of conductors extend at an angle of 90° with respect to said conductors of said second plurality of conductors and the planes of said first and second pluralities of conductors are parallel.

7. The apparatus of claim 6 which further includes means for modulating the instantaneous frequency of said first time varying signal with a sub-harmonic of said second time varying signal.

* * * * *